June 5, 1962 L. C. PHIPPS III 3,037,616
CONTACT LENS CASE
Filed June 17, 1960

INVENTOR.
LAWRENCE C. PHIPPS, III
BY
ATTORNEYS

United States Patent Office 3,037,616
Patented June 5, 1962

3,037,616
CONTACT LENS CASE
Lawrence C. Phipps III, Denver, Colo., assignor to General Optics, Inc., Denver, Colo., a corporation of Colorado
Filed June 17, 1960, Ser. No. 36,950
15 Claims. (Cl. 206—5)

This invention relates to a novel and improved carrying case for contact lenses that overcomes many of the shortcomings of prior art devices for this purpose.

The size of contact lenses, the fact that they are worn directly against the eye and the elimination of any kind of a frame are some of the most significant advantages of these devices; however, these same factors give rise to a number of problems that are not easily solved. Take, for example, the size factor. From the aesthetic standpoint, this is, perhaps, the reason most persons have adopted contacts in preference to ordinary framed spectacles as it is extremely difficult to determine if corrective lenses are being worn at all. On the other hand, contacts are considerably more expensive than ordinary glasses and their loss is a matter of no little concern to most people. Dime-sized bits of clear glass can, and often do, become impossible to locate if they become lost to say nothing of the likelihood that they will be scratched or broken before they are found. Accordingly, a compact carrying case that holds the lenses securely in place therein is an essential accessory for the contact lens user.

The elimination of the conventional frame also has certain disadvantages. Among these are the fact that the right and left lenses are no longer oriented relative to one another nor is it possible in most instances to tell one from the other by a mere visual inspection, the two lenses seldom being ground to provide the same correction. Therefore, it becomes essential to provide some convenient means for maintaining the right lens separated from the left and identifiable in relation thereto.

Along the same line, spectacle frames have heretofore provided a supporting structure useful in handling the lenses for cleaning purposes and also imparting a degree of structural stability thereto that reduces breakage. Contacts, on the other hand, have no such supporting frame and must be handled by placing the fingers directly against the glass. For this reason, considerable care must be exercised by the user in handling contacts, the recommended procedure being to touch them only along their edges. Unfortunately, the design of many of the available contact lens cases is completely incompatible with this recommended procedure, thus necessitating that the faces of the lenses be grasped whenever they are placed in the case or withdrawn therefrom. Incidental to this procedure, of course, the lenses must be cleaned to remove fingerprints preparatory to each use.

In addition, contact lenses should be moistened at the time they are placed against the eye and a case that could provide a convenient method of accomplishing this operation incidental to its prime function of protecting the lenses would be highly desirable. Obviously, the most important purpose to be performed by any contact lens case is that of protecting the lenses against breakage, scratches under stress likely to cause deformation thereof, and any other circumstance that might make them less acceptable for their intended use.

It is, therefore, the principal object of the present invention to provide a novel and improved carrying case for contact lenses.

A second objective is to provide a case of the type described that provides adequate protection for the delicate lenses against scratches or breakage even as a result of severe impact blows due to the inclusion of a sponge-type cushion and a bendable retaining member.

Another object is the provision of a contact lens case that is designed such that the lenses are maintained separate from one another, identified as to location, and accessible one at a time without subjecting the other to the danger of being dropped and lost.

Still another objective of the instant invention is to provide a carrying case for contact lenses that can be used as a soaking kit and even to maintain the lenses wetted while being carried around in the pocket or purse.

An additional objective is the provision of a contact case so designed that the lenses cannot be inserted therein or withdrawn unless they are held by the edges in accordance with the recommended procedure.

Further objects are the provision of a lens case of the type described which is compact, lightweight, rugged, adapted for use with any of the popular contact lens designs, one that is simple to use, inexpensive and versatile, and a case that is decorative in appearance.

Other objects will be in part apparent and in part pointed out specifically hereinafter in connection with the description of the drawings that follow, and in which.

Figure 1:
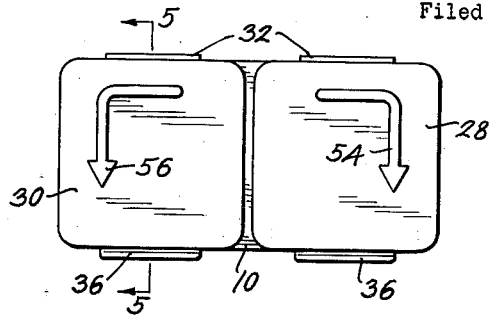
FIGURE 1 is a top plan view of the contact lens carrying case of the present invention showing it in closed position.
Figure 3:
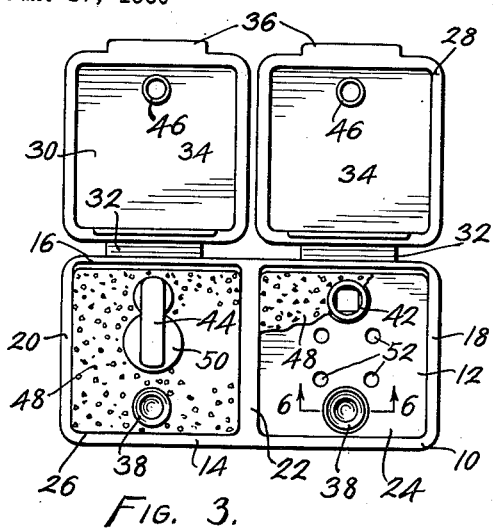
FIGURE 3 is a top plan view showing the case in open position with a portion of the sponge cushion broken away and the retaining member removed from one side to better expose the interior construction.

Referring now to the drawings for a detailed description of the contact lens case of the present invention, and in particular to FIGURES 1–4, inclusive, for this purpose, it will be seen to include a relatively thin generally rectangular body portion 10 having a bottom 12, front and rear side walls 14 and 16, right and left end walls 18 and 20, and a central wall 22 that cooperates with the bottom, side and end walls to define right and left cavities 24 and 26 of a substantially square shape in the particular form illustrated herein. Right and left lid portions 28 and 30 are hingedly connected along their rear edges by integrally-formed hinges 32 to the rear side wall 16 of the body in side-by-side relation to one another and in position to provide closures for the right and left cavities 24 and 26, respectively. Each lid portion has a rather shallow cavity or depression 34 formed in the underside thereof corresponding generally in size and shape to the cavities in the body portion. The front edges of the lid portions are provided with projecting portions 36 that form fingerholds for the purpose of assisting the user to open the case.

The body portion 10, lid portions 28 and 30, hinge elements 32 and fingerholds 36 are preferably molded integral with one another from a single mass of water-resistant deformable plastic. Also, the cavities of the body portion contain the female element 38 of the lid fastener assembly that has been indicated in a general way by numeral 40 and the socket 42 that receives the lens retainer 44, elements 38 and 42 being integrally molded into the bottom 12. Similarly, the male element 46 of the lid fastener assembly is integrally-formed inside each of the lids. A sponge-type cushion 48 having openings therein sized and located to receive elements 38 and 42 projecting upwardly from the bottom of the body portion is positioned within cavities 24 and 26 of the latter. The lens retainer 44 when in place within its socket 42 functions to hold a contact lens 50 (FIGURE 3) down on the cushion. Therefore, sponge cushions 48, being in direct contact with the surface of the lens 50 must be formed of a non-abrasive material that will not scratch or otherwise mar the surface. Also, cushion 48 is preferably formed from a lintless substance so that the lenses require no cleaning when removed from the case. Plastic sponges have been found quite acceptable for this purpose as long as they are of the type that remain soft and resilient even when they are dry such as, for example, those made from polyurethane foam.

The bottom 12 of the body portion 10 contains at least one opening 52 communicating with the interior of each cavity 24 and 26. These openings provide means for saturating the sponge cushions without opening the lids as it is only necessary to immerse the entire case within a glass of water. Many contact lens wearers like to soak their contacts overnight when they are not in use and the instant case provides a convenient soaking kit for this purpose that does not require removal of the lenses and the attendant risk of their loss or damage. Another attractive feature is that the lenses can be kept wet even while they are being carried around on the person by merely shaking the excess water from the case and placing it in the pocket or purse. It is sometimes difficult or inconvenient to wet the lenses in public preparatory to use; however, the sponge cushions of the present case will retain sufficient liquid for this purpose over a period of several hours.

Figure 2:
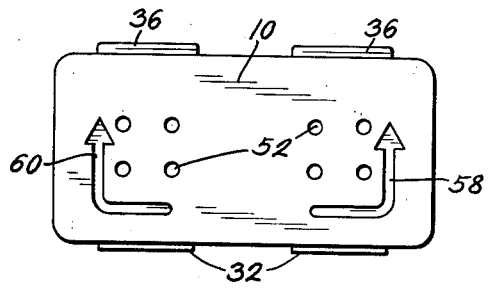
FIGURE 2 is a bottom plan view thereof in closed position.

One remaining feature should be mentioned briefly before proceeding with a description of the remaining figures of the drawing. Note in FIGURE 1 that both the right and left lid portions 28 and 30 each include generally L-shaped right and left arrows 54 and 56, respectively, that indicate the section of the case into which the right and left lenses are to be inserted and carried. Similar arrows 58 and 60 are provided on the bottom 12 of the body portion as shown in FIGURE 2. One pair of arrows, 54 and 56 as illustrated, is raised from the plane of the case; whereas, the other set, 58 and 60, is preferably indented. By properly locating the indented and raised sets relative to one another it becomes possible to fit one within the other when the cases are stacked to facilitate packing and storage thereof.

Figure 6:
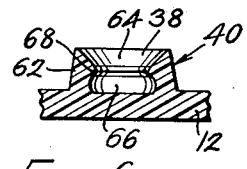
FIGURE 6 is a fragmentary sectional detail to an enlarged scale taken along line 6—6 of FIGURE 3 showing the female portion of the friction fastener that holds the lids in closed position on the body.
Figure 4:
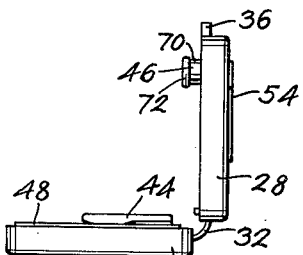
FIGURE 4 is a right end elevation showing the lids in partially open position.

Now, with reference to FIGURES 3–6, inclusive, the lid fastener assembly 40 will be described in detail. As aforementioned, the male element 46 thereof is formed integrally with the lid while the female element 38 comprises a part of the bottom of the body portion. As best seen in FIGURE 6, female element 38 consists of a short upstanding tubular portion 62 having an upwardly and outwardly flaring entryway 64 terminating in a slightly enlarged pocket 66 at the bottom that defines an annular inturned rib 68 therebetween.

The male element 46, on the other hand, comprises a generally cylindrical section 70 terminating at its free lower end in an upset or enlarged portion 72 of slightly greater diameter of the inturned rib 68 of the female element. In addition, the free end of the male element 46 is provided with a shallow socket 74 for the purpose of permitting the enlargement 72 to contract inwardly as it passes over the rib 68 of the female element 38. Of course, some expansion of the female element will also take place as the upset portion 72 of the male element is guided into the pocket 66 past rib 68 by means of the flared entryway 64. It has been found that a secure, yet easily opened, frictional fit between the male and female elements of the lid fastener 40 is obtained through use of the foregoing structure and, while it is obvious that many other types and styles of lid clasps could be used with good results in place thereof, it has the advantage of considerable simplicity.

Figures 10, 11:
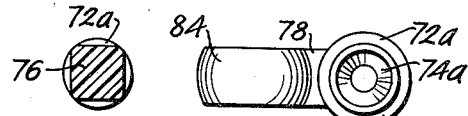
FIGURE 10 is a bottom plan view to an enlarged scale of the lens retaining member; and, FIGURE 11 is a section taken along line 11—11 of FIGURE 7.
Figure 7:
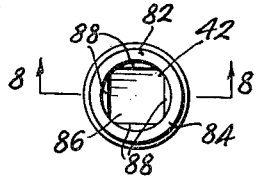
FIGURE 7 is a fragmentary top plan view to an enlarged scale showing the socket within which the lens retaining member is removably secured.
Figure 8:
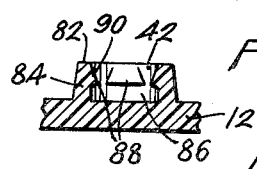
FIGURE 8 is a section taken along line 8—8 of FIGURE 7.

Finally, referring to FIGURES 3, 5 and 7–11, the lens retaining member 44 will be described. In many respects, the means by which the retaining member is detachably connected within the body 10 is like the lid fastener assembly 40 except that it includes structure adapted to prevent relative rotational movement between the elements thereof. For instance the lens retainer has a short portion 76 of a generally rectangular cross section as shown in FIGURE 11 rather than cylindrical as was the case with portion 70 of the fastener assembly 40. Rectangular portion 76 terminates at its free end in an enlarged or upset portion 72a much like that of portion 72. The depression 74a in the end is somewhat shallower than that of depression 74 in the lid assembly due to the shorter length of rectangular portion 76; however, both depressions function in the same manner to permit a partial collapse of the enlarged portions circumscribing same as they pass into their respective sockets formed in the body.

The retainer 44 has a bendable arm 78 extending forwardly from the point of attachment thereof with the body. In the form illustrated, an annular shoulder 80 is provided between this arm 78 and the rectangular portion 76 adapted to rest upon the upper rim 82 of lens retainer socket 42 when in the assembled relation of FIGURE 5.

Figure 5:
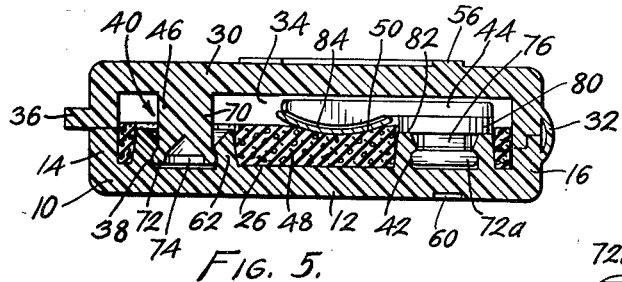
FIGURE 5 is a sectional view to an enlarged scale taken along line 5—5 of FIGURE 1.
Figure 9:
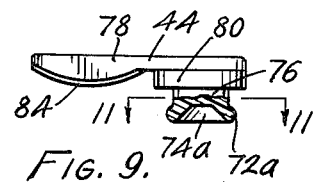
FIGURE 9 is a side elevation to an enlarged scale showing the lens retaining member, portions thereof having been broken away and indicated in section to better expose the interior construction.

The underside of the front or free end of arm 78 is shaped to provide a convex substantially spherical surface 84 adapted to conform generally with the concave inner surface of a contact lens 50. The width of arm 78 is substantially less than the diameter of the lens so that the latter can be grasped by the edges with the thumb and forefinger and slipped into place between the spherical surface and the cushion as shown in FIGURE 5. The arm 78 is bendable and springy so that it functions to hold the lens slightly depressed within the sponge cushion. The cushion and sponge thus cooperate with one another to maintain the lens securely in place inside the case and also protect it against shock, abrasion, deforming forces and breakage.

Now, the socket 42 for the lens retainer will be seen to comprise an upstanding annular wall portion 84 terminating in a substantially planar upper edge 82 that surrounds a cylindrical depression 86. The inner cylindrical wall surface of the socket 42 contains at least one, and preferably two pair, of diametrically positioned inwardly extending projections 88 that cooperate with the flat faces on the rectangular portion 76 of the lens retainer to maintain the latter properly oriented within the body. Also, the diametrical spacing between the adjacent edges of each pair of projections 88 is slightly less than the diameter of the upset portion 72a on the retainer so that the last-mentioned portion will lock underneath said projections which compress slightly as the enlargement moves into seated position. The inner surfaces of the projections 88 are preferably upwardly and outwardly inclined as shown at 90 to guide the retainer into the socket 42.

Having thus described the several useful and novel features of the contact lens case of the present invention it will be apparent that the many worthwhile objectives for which it was designed have been achieved. Although but a single specific embodiment of the invention has been illustrated in the accompanying drawings, I realize that certain changes and improvements therein may well occur to those skilled in the art within the broad teaching hereof; hence, it is my intention that the scope of protection afforded hereby shall be limited only insofar as said limitations are expressly set forth in the appended claims.

What is claimed is:

1. A contact lens case which comprises, a body having a bottom bordered by upstanding wall portions cooperating with one another to define at least one relatively shallow cavity, a resilient non-abrasive sponge-like mat positioned within each cavity forming a cushion, lid means mountable on the body in position to provide a cover over each cavity, and lens-retaining means comprising a springable arm attached within the body with a portion thereof extending over the cushion in position to receive and hold a contact lens therebetween.

2. The contact lens case as set forth in claim 1 in which the body contains at least one opening communicating the interior of each cavity for the purpose of admitting fluids thereto when the case is immersed, said fluids providing means for saturating the cushion and wetting the lens supported thereon.

3. The contact lens case as set forth in claim 1 in which the wall portions divide the body into a pair of cavities arranged in side-by-side relation, and a lens retaining arm is provided in each cavity.

4. The contact lens case as set forth in claim 3 in which the body is generally rectangular, the wall portions thereof comprise front and rear side walls, right and left end walls, and a central wall located intermediate the end walls extending between the side walls that divides the body into the pair of cavities.

5. The contact lens case as set forth in claim 1 in which each lid means is hingedly connected to the body for movement between an open and a closed position, and a releasable fastener means interconnects the body with each lid means in closed position.

6. The contact lens case as set forth in claim 1 in which at least the lens-engaging portion of the springable arms is formed from a non-abrasive material of a type that will not scratch or otherwise damage the polished surface of a contact lens.

7. The contact lens case as set forth in claim 6 in which the springable arm is of a width substantially less than the diameter of a contact lens.

8. The contact lens case as set forth in claim 1 in which the springable arm is of a width substantially less than the diameter of a contact lens.

9. Contact lens case which comprises a body having a bottom bordered by upstanding wall portions cooperating with one another to define at least one relatively shallow cavity, a resilient non-abrasive sponge-like mat positioned within each cavity forming a cushion, lid means mountable on the body in position to provide a cover over each cavity, and lens-retaining means comprising a springable arm formed to provide a convex generally spherical surface adapted to conform approximately with the concave inner surface of a contact lens, and attached within the body with a portion thereof extending over the cushion in position to receive and hold a contact lens therebetween.

10. A contact lens case which comprises, a body having a bottom bordered by upstanding wall portions cooperating with one another to define at least one relatively shallow cavity, a resilient non-abrasive sponge-like mat positioned within each cavity forming a cushion, lid means mountable on the body in position to provide a cover over each cavity, and lens-retaining means comprising a springable arm attached within the body with a portion thereof extending over the cushion in position to receive and hold a contact lens therebetween; and further comprising at least one generally tubular socket-forming element projects upwardly from the bottom into the interior of each cavity, each of said sockets having an upwardly flared entryway and an annular groove in the bottom defining a rib-like projection therebetween, each cushion contains an opening therethrough positioned and sized to receive each tubular element when laid in place within the cavity, and the springable arm includes a post-forming portion terminating in an enlarged end sized to spread the rib-like projection of one of the sockets in the body apart upon passage thereof into the annular groove.

11. A contact lens case which comprises, a body having a bottom bordered by upstanding wall portions cooperating with one another to define at least one relatively shallow cavity, a resilient non-abrasive sponge-like mat positioned within each cavity forming a cushion, lid means mountable on the body in position to cover over each cavity, and lens-retaining means comprising a springable arm attached within the body with a portion thereof extending over the cushion in position to receive and hold a contact lens therebetween, lid means hingedly connected to the body for movement between an open and a closed position, and releasable fastener means interconnecting the body with each lid means in closed position, said releasable fastener means comprising a generally tubular socket-forming element projecting upwardly from the bottom into the interior of each cavity, said socket having an upwardly flared entryway and an annular goove in the bottom defining a rib-like projection therebetween, and a post-forming portion terminating in an enlarged end projecting downwardly from the underside of the like means in position to enter the socket when said lid means is closed, the enlarged end being sized to spread the rib-like projection of the socket apart as it passes into the annular groove.

12. A contact lens case which comprises, a body having a bottom bordered by upstanding wall portions cooperating with one another to define at least one relatively shallow cavity, a resilient non-abrasive sponge-like mat positioned within each cavity forming a cushion, lid means mountable on the body in position to provide a cover over each cavity, and lens-retaining means comprising a springable arm attached within the body with a portion thereof extending over the cushion in position to receive and hold a contact lens therebeweeen, the lens-engaging portion of the springable arm being formed to provide a convex generally spherical surface adapted to conform approximately with the concave inner surface of a contact lens.

13. A contact lens case which comprises, a body having a bottom bordered by upstanding wall portions cooperating with one another to define at least one relatively shallow cavity, a resilient non-abrasive sponge-like mat positioned within each cavity forming a cushion, lid means mountable on the body in position to provide a cover over each cavity, and lens-retaining means comprising a springable arm attached within the body with a portion thereof extending over the cushion in position to receive and hold a contact lens therebetween, said springable arm having a width substantially less than the diameter of a contact lens and the lens-engaging portion of a springable arm being formed to provide a convex generally spherical surface adapted to conform approximately with the concave inner surface of a contact lens.

14. A contact lens case which comprises, a body having a bottom bordered by upstanding wall portions cooperating with one another to define at least one relatively shallow cavity, a resilient non-abrasive sponge-like mat positioned within each cavity forming a cushion, lid means mountable on the body in position to provide a cover over each cavity, and lens-retaining means comprising a spingable arm attached within the body wtih a portion thereof extending over the cushion in position to receive and hold a contact lens therebetween; and further comprising at least one generally tubular socket-forming element projects upwardly from the bottom into the interior of each cavity, each of said sockets having an upwardly flared entryway and an annular groove in the bottom defining a rib-like projection therebetween, each cushion contains an opening therethrough positioned and sized to receive each tubular element when laid in place within the cavity, and the springable arm includes a post-forming portion terminating in an enlarged end sized to spread the rib-like projection of one of the sockets in the body apart upon passage therefrom into the annular groove, a pair of socket-forming portions terminating in an enlarged end project downwardly from the underside of a like means in position to enter the socket of the pair that does not hold the springable arm when said lid means is closed, said enlarged end being sized to spread the rib-like projection of the socket apart as it passes into the annular groove.

15. A contact lens case which comprises, a body having a bottom bordered by upstanding wall portions co-operating with one another to define at least one relatively shallow cavity, a resilient non-abrasive sponge-like mat positioned within each cavity forming a cushion, lid means mountable on the body in position to provide a cover over each cavity, and lens-retaining means comprising a springable arm attached within the body with a portion thereof extending over the cushion in position to receive and hold a contact lens therebetween; and further comprising at least one generally tubular socket-forming element projecting upwardly from the bottom into the interior of each cavity, each of said sockets having an upwardly flared entryway and an annular groove in the bottom defining a rib-like projection therebetween, each cushion contains an opening therethrough positioned and sized to receive each tubular element when laid in place within the cavity, and the springable arm includes a post-forming portion terminating in an enlarged end sized to spread the rib-like projection of one of the sockets in the body apart upon passage thereof into the annular groove, the said rib-like projection of the socket and the post-forming means on the springable arm cooperating with one another to prevent relative rotational movement therebetween.

References Cited in the file of this patent

UNITED STATES PATENTS

| | | |
|---|---|---|
| 2,620,919 | Passmore | Dec. 9, 1952 |
| 2,687,157 | Cowan | Aug. 24, 1954 |
| 2,803,865 | Eljanian et al. | Aug. 27, 1957 |

FOREIGN PATENTS

| | | |
|---|---|---|
| 657,516 | Great Britain | Sept. 19, 1951 |